(12) United States Patent
Ahmed et al.

(10) Patent No.: US 7,729,546 B2
(45) Date of Patent: Jun. 1, 2010

(54) DOCUMENT SEGMENTATION FOR MIXED RASTER CONTENT REPRESENTATION

(75) Inventors: Mohamed Nooman Ahmed, Louisville, KY (US); Tomasz Jan Cholewo, Lexington, KY (US); Steven Frank Weed, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 213 days.

(21) Appl. No.: 11/318,309

(22) Filed: Dec. 23, 2005

(65) Prior Publication Data

US 2007/0150803 A1    Jun. 28, 2007

(51) Int. Cl.
*G06K 9/36* (2006.01)
(52) U.S. Cl. .................................... 382/232
(58) Field of Classification Search .............. 382/232, 382/233, 248, 250, 173, 176, 177, 178, 179; 345/555; 358/426.01–426.16; 375/122; 708/203
See application file for complete search history.

(56) References Cited

U.S. PATENT DOCUMENTS

| | | | |
|---|---|---|---|
| 4,668,995 A | 5/1987 | Chen et al. | |
| 5,050,222 A | 9/1991 | Lee | |
| 5,202,933 A | 4/1993 | Bloomberg | |
| 5,321,770 A | 6/1994 | Huttenlocher et al. | |
| 5,392,362 A | 2/1995 | Kimura et al. | |
| 5,416,604 A * | 5/1995 | Park | 382/232 |
| 5,638,498 A * | 6/1997 | Tyler et al. | 358/1.18 |
| 5,745,596 A | 4/1998 | Jefferson | |
| 5,767,978 A | 6/1998 | Revankar et al. | |
| 5,774,579 A | 6/1998 | Wang et al. | |
| 5,778,092 A | 7/1998 | MacLeod et al. | |
| 5,850,474 A | 12/1998 | Fan et al. | |
| 5,875,041 A * | 2/1999 | Nakatani et al. | 358/462 |
| 5,982,937 A | 11/1999 | Accad | |
| 6,044,178 A | 3/2000 | Lin | |
| 6,163,625 A | 12/2000 | Ng et al. | |
| 6,173,088 B1 | 1/2001 | Koh et al. | |
| 6,185,329 B1 | 2/2001 | Zhang et al. | |
| 6,195,459 B1 | 2/2001 | Zhu | |
| 6,229,923 B1 | 5/2001 | Williams et al. | |
| 6,249,604 B1 | 6/2001 | Huttennlocher et al. | |
| 6,324,305 B1 | 11/2001 | Holladay et al. | |
| 6,411,733 B1 | 6/2002 | Saund | |
| 6,437,881 B1 | 8/2002 | Baba et al. | |
| 6,587,583 B1 | 7/2003 | Kurzweil et al. | |
| 6,608,928 B1 | 8/2003 | Queiroz | |
| 6,625,323 B2 | 9/2003 | Henderson et al. | |
| 6,633,670 B1 | 10/2003 | Matthews | |
| 6,701,012 B1 | 3/2004 | Matthews | |
| 6,731,800 B1 * | 5/2004 | Barthel et al. | 382/176 |
| 6,731,814 B2 | 5/2004 | Zeck et al. | |

(Continued)

*Primary Examiner*—Samir A Ahmed
*Assistant Examiner*—Atiba O Fitzpatrick

(57) ABSTRACT

In an array of pixels, a method for segmenting a selected pixel of the array between at least two layers including identifying an N-by-N window centered upon the selected pixel, evaluating at least one pixel in the N-by-N window to determine whether the selected pixel is a potential text element, identifying an M-by-M window centered upon the selected pixel when the evaluation determines that the selected pixel is a potential text element, wherein the M-by-M window is smaller than the N-by-N window, and determining whether the potential text element includes text by comparing at least two pixels within the M-by-M window.

13 Claims, 2 Drawing Sheets

U.S. PATENT DOCUMENTS

| | | |
|---|---|---|
| 6,836,564 B2 | 12/2004 | Katayama et al. |
| 6,853,755 B2 | 2/2005 | Li |
| 7,035,463 B1 * | 4/2006 | Monobe et al. ............. 382/177 |
| 7,039,235 B1 * | 5/2006 | Katsuyama ................ 382/195 |
| 7,245,740 B2 * | 7/2007 | Suzaki ...................... 382/100 |
| 2002/0037100 A1 | 3/2002 | Toda et al. |
| 2002/0136460 A1 | 9/2002 | Bottou et al. |
| 2003/0031361 A1 | 2/2003 | Said |

* cited by examiner

Fig. 1

|    | A | B | C | D | E | F | G | H | I | J | K | L | M | N | O | P | Q | R | S |
|----|---|---|---|---|---|---|---|---|---|---|---|---|---|---|---|---|---|---|---|
| 1  | 50 | 50 | 50 | 50 | 50 | 50 | 50 | 50 | 50 | 50 | 50 | 50 | 50 | 50 | 50 | 50 | 50 | 50 | 50 |
| 2  | 50 | 50 | 50 | 50 | 50 | 50 | 50 | 50 | 50 | 50 | 50 | 50 | 50 | 50 | 50 | 50 | 50 | 50 | 50 |
| 3  | 50 | 50 | 50 | 50 | 50 | 50 | 50 | 50 | 50 | 50 | 50 | 50 | 50 | 50 | 50 | 50 | 50 | 50 | 50 |
| 4  | 50 | 50 | 50 | 50 | 50 | 50 | 50 | 50 | 50 | 50 | 50 | 50 | 50 | 50 | 50 | 50 | 50 | 50 | 50 |
| 5  | 50 | 50 | 50 | 50 | 50 | 50 | 50 | 50 | 50 | 50 | 50 | 50 | 50 | 50 | 50 | 50 | 50 | 50 | 50 |
| 6  | 50 | 50 | 50 | 50 | 50 | 50 | 50 | 50 | 50 | 50 | 50 | 50 | 50 | 50 | 50 | 50 | 50 | 50 | 50 |
| 7  | 50 | 50 | 50 | 50 | 50 | 50 | 50 | 50 | 50 | 50 | 50 | 50 | 50 | 50 | 50 | 50 | 50 | 50 | 50 |
| 8  | 50 | 50 | 50 | 50 | 50 | 50 | 50 | 50 | 50 | 50 | 50 | 50 | 50 | 50 | 50 | 50 | 50 | 50 | 50 |
| 9  | 50 | 50 | 50 | 50 | 50 | 50 | 50 | 50 | 50 | 50 | 50 | 50 | 50 | 50 | 50 | 50 | 50 | 50 | 50 |
| 10 | 50 | 50 | 50 | 50 | 50 | 50 | 50 | 50 | 50 | 50 | 50 | 50 | 50 | 50 | 50 | 50 | 50 | 50 | 50 |
| 11 | 50 | 50 | 50 | 50 | 50 | 50 | 50 | 50 | 50 | 50 | 50 | 50 | 50 | 50 | 50 | 50 | 50 | 50 | 50 |
| 12 | 50 | 50 | 50 | 50 | 50 | 50 | 50 | 50 | 50 | 50 | 50 | 50 | 50 | 50 | 50 | 50 | 50 | 50 | 50 |
| 13 | 250 | 250 | 250 | 250 | 250 | 250 | 250 | 250 | 250 | 250 | 250 | 250 | 250 | 50 | 50 | 50 | 50 | 50 | 50 |
| 14 | 50 | 50 | 50 | 250 | 50 | 50 | 50 | 50 | 50 | 50 | 50 | 50 | 50 | 50 | 50 | 50 | 50 | 50 | 50 |
| 15 | 50 | 50 | 50 | 250 | 50 | 50 | 50 | 50 | 50 | 50 | 50 | 50 | 50 | 50 | 50 | 50 | 50 | 50 | 50 |
| 16 | 50 | 50 | 50 | 250 | 50 | 50 | 50 | 50 | 50 | 50 | 50 | 50 | 50 | 50 | 50 | 50 | 50 | 50 | 50 |
| 17 | 50 | 50 | 50 | 250 | 50 | 50 | 50 | 50 | 50 | 50 | 50 | 50 | 50 | 50 | 50 | 50 | 50 | 50 | 50 |
| 18 | 50 | 50 | 50 | 250 | 50 | 50 | 50 | 50 | 50 | 50 | 50 | 50 | 50 | 50 | 50 | 50 | 50 | 50 | 50 |
| 19 | 50 | 50 | 50 | 250 | 50 | 50 | 50 | 50 | 50 | 50 | 50 | 50 | 50 | 50 | 50 | 50 | 50 | 50 | 50 |

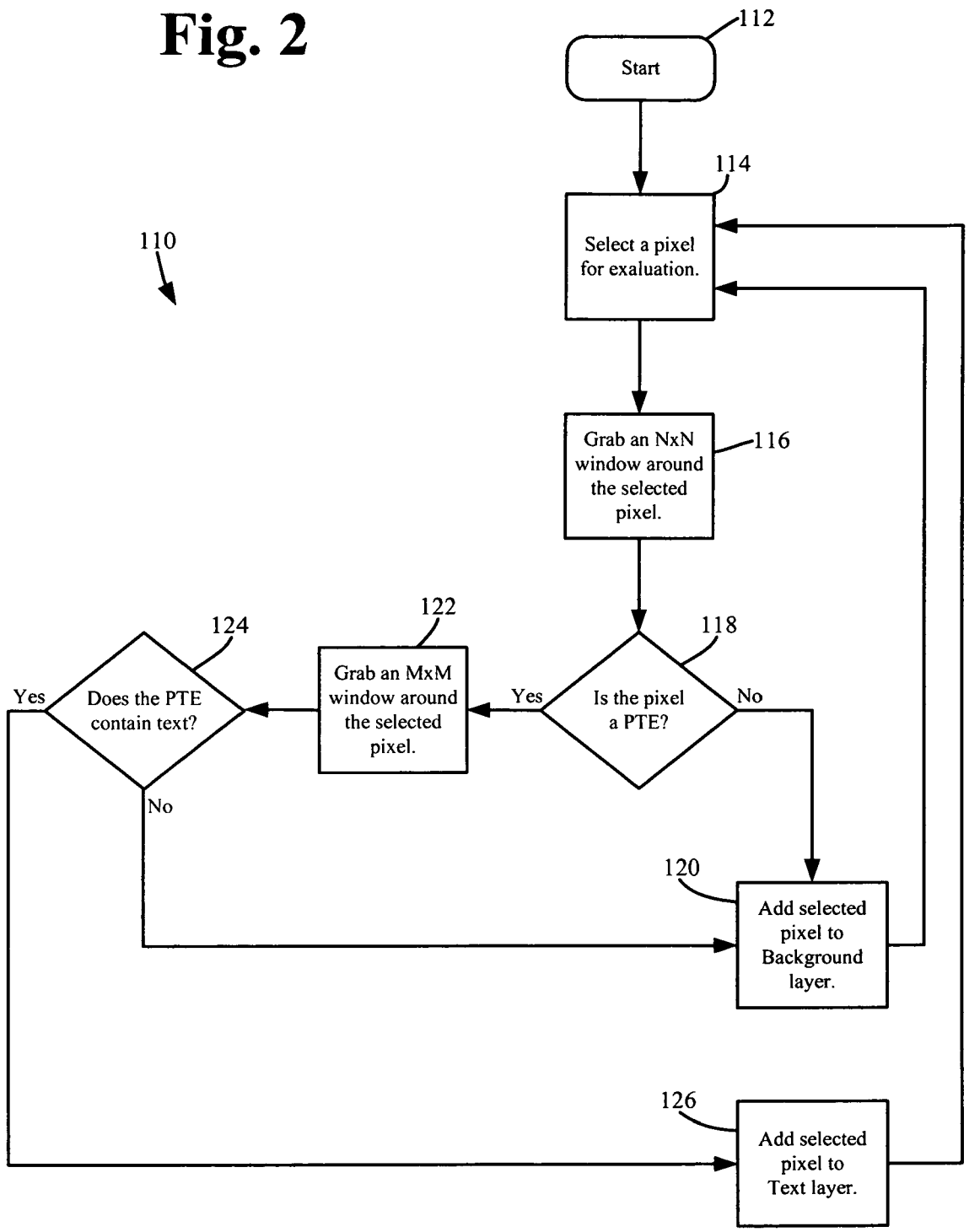

DOCUMENT SEGMENTATION FOR MIXED RASTER CONTENT REPRESENTATION

BACKGROUND

1. Field of the Invention

The present application relates to compression techniques and, more particularly, improved compression techniques for use with the mixed raster content compression format.

2. Description of the Related Art

Image compression addresses the problem of reducing the amount of data required to represent a digital image. Compressed data (i.e., text and/or image data) may be easier to transmit by, for example, facsimile and/or e-mail than non-compressed data.

The underlying basis of the reduction process is the removal of redundant data during a scanning operation or, alternatively, from existing electronic files. Compression techniques typically fall into two broad categories: information preserving compression (i.e., lossless compression) and lossy compression. Lossless compression allows data to be compressed and decompressed without the loss of information. Lossy compression provides higher levels of data reduction as compared to lossless compression but results in a less than perfect reproduction of the original image (i.e., information loss).

Lossless compression methods (e.g., Lempel-Ziv or LZW) perform well on text but do not perform particularly well on scanned images. In contrast, lossy compression methods (e.g., JPEG) work fairly well on continuous-tone pixel arrays but do not work particularly well on text.

Accordingly, the mixed raster content (MRC) format may be used to compress documents including both text and images. The MRC format segments a document into two or more planes or layers. For example, each pixel in a document may be segmented into a text layer, a foreground layer and a background layer, as described in U.S. Pat. Nos. 5,778,092 and 6,324,305, the entire contents of which are incorporated herein by reference. The text layer may include only text data of the document, the foreground layer may include color information of the text data and the background layer may include any image that is not considered text data.

Once each pixel has been segmented between two or more layers, each layer may be separately compressed using an appropriate compression method based on the content of the layer. For example, the text layer may be compressed using a lossless compression method such as LZW while the foreground and background layers may be compressed using a lossy compression method such as Joint Photographic Experts Group (JPEG).

In the prior art, the segmentation step may be carried out by separating high frequency pixels, which typically are associated with text, from low frequency pixels, which typically are associated with image and background data. Such edge detection techniques often misclassify pixels belonging to large halftone dots (i.e., halftone dots having a size equal to or greater than the edge detector kernel) as high frequency pixels and therefore treat them as text pixels, thereby increasing the size of the compressed file.

Accordingly, there is a need for a segmentation technique having an improved capability for detecting the difference between halftone areas and text areas.

SUMMARY OF THE INVENTION

In one aspect, the segmentation method provides a method for segmenting a selected pixel of an array of pixels between at least two layers. The method includes identifying an N-by-N window centered upon the selected pixel, evaluating at least one pixel in the N-by-N window to determine whether the selected pixel is a potential text element, identifying an M-by-M window centered upon the selected pixel when the act of evaluating determines that the selected pixel is a potential text element, wherein the M-by-M window is smaller than the N-by-N window, and determining whether the potential text element includes text by comparing at least two pixels within the M-by-M window.

In another aspect, the segmentation method provides a method for segmenting a selected pixel of an array of pixels between at least two layers. The method includes identifying a N-by-N window centered on the selected pixel, obtaining a total intensity value for each row, column and major diagonal of the N-by-N window, comparing the total intensity values to determine whether the selected pixel is a potential text element, identifying a M-by-M window centered on the selected pixel when the selected pixel is determined to be a potential text element, wherein the M-by-M window is smaller than the N-by-N window, and comparing at least two oppositely positioned pixels within the M-by-M window to determine whether the potential text element includes text.

Other aspects of the segmentation method will become apparent from the following description, the accompanying drawings and the appended claims.

BRIEF DESCRIPTION OF THE DRAWINGS

FIG. 1 is a schematic diagram of a pixel array according to a first aspect of the segmentation method; and FIG. 2 is a flow diagram according to another aspect of the segmentation method.

DETAILED DESCRIPTION

As shown in FIG. 1, a document may be represented as a pixel array 100 having X number of rows and Y number of columns. For example, as shown in FIG. 1, the pixel array 100 may include 19 rows of pixels (i.e., rows 1 to 19 in FIG. 1) and 19 columns of pixels (i.e., columns A to S in FIG. 1) for a total of 361 pixels. Thus, when a document is being segmented and compressed, each pixel must be segmented to one of at least two layers. In one aspect, each pixel may be segmented to either a background layer, a foreground layer or a text layer. In another aspect, each pixel may be segmented to either a background layer or a text layer.

As shown in FIG. 2, the segmentation method, generally designated 110, may begin at box 112. As shown at box 114, a pixel may be selected from the pixel array 100 for evaluation and segmentation. For example, referring to FIG. 1, the segmentation method 110 may select pixel J-10 (i.e., the pixel located at row 10 of column J), designated as pixel 130, from pixel array 100 for evaluation and segmentation. Once pixel 130 has been selected, the segmentation method 110 may determine whether the selected pixel 130 is a potential text element (PTE), as shown in boxes 116 and 118 of FIG. 2. A PTE may be a pixel that potentially includes text or a pixel that may ultimately be classified as text. If the method 110 determines that the selected pixel 130 is not a PTE, the pixel 130 may be segmented to the background layer, as shown in box 120, and the method 110 may select another pixel for evaluation and segmentation, as shown in box 114. If the method 110 determines that the selected pixel 130 is a PTE, the method 110 may further evaluate the pixel, as shown in boxes 122 and 124, to determine whether the pixel 130 includes text. If the method 110 determines that the selected pixel 130 includes text, the pixel 130 may be segmented to the text layer, as shown in box 126, and the method 110 may proceed to the next pixel, as shown in box 114. If the method 110 determines that the pixel 130 does not include text, the pixel 130 may be segmented to the background layer, as shown in box 120, and the method 110 may proceed to the next pixel, as shown in box 114. Thus, the method 110 may evaluate and segment each pixel in the array 100.

The first act in the process (i.e., PTE detection), as shown in boxes 116 and 118, may include determining whether the selected pixel is a PTE. PTE detection may begin by identifying an N-by-N window 132 around the selected pixel 130. "N" may be any number and may be selected by the user or may be pre-programmed. "N" should be sufficiently large to allow the method 110 to identify halftone dots, edges and the like. In one aspect, "N" may be a number between about 5 and about 500.

For example, as shown in FIG. 1, the selected pixel 130 may be pixel J-10 and N may equal 17. Thus, the window 132 (i.e., a 17 by 17 window) may include 17 rows (i.e., rows 2 to 18) and 17 columns (i.e., columns B to R) centered on pixel 130 (i.e., pixel J-10).

Each pixel in the array 100 may have an associated intensity value (i.e., a pixel intensity), as shown by numbers 50 and 250 throughout FIG. 1. For example, the intensity value may be a number between about 0 and about 255. In one aspect, the method 110 may directly use each pixel's color value (e.g., red, green, blue or grey color values). In another aspect, the method 110 may derive a pixel's intensity value from its color values.

Once a window 132 around selected pixel 130 has been identified, the method 110 may proceed to sum the intensity values of each row of pixels (i.e., a summation of the pixel intensity of each pixel in a row for each row in the window 132), each column of pixels (i.e., a summation of the pixel intensity of each pixel in a column for each column in the window 132) and each major diagonal of pixels (i.e., a summation of the pixel intensity of each pixel in a diagonal for each major diagonal in the window 132).

For example, as shown in FIG. 1, the summation of the intensity values for each row of window 132 (i.e., rows 2 to 18) are provided in Table 1:

TABLE 1

| Row | Total Intensity |
|---|---|
| 2 | 850 |
| 3 | 850 |
| 4 | 850 |
| 5 | 850 |
| 6 | 850 |
| 7 | 850 |
| 8 | 850 |
| 9 | 850 |
| 10 | 850 |
| 11 | 850 |
| 12 | 850 |
| 13 | 3250 |
| 14 | 1050 |
| 15 | 1050 |
| 16 | 1050 |
| 17 | 1050 |
| 18 | 1050 |

The summation of the intensity values for each column of window 132 (i.e., columns B to R) are provided in Table 2:

TABLE 2

| Column | Total Intensity |
|---|---|
| B | 1050 |
| C | 1050 |
| D | 2050 |
| E | 1050 |
| F | 1050 |
| G | 1050 |
| H | 1050 |
| I | 1050 |
| J | 1050 |
| K | 1050 |
| L | 1050 |
| M | 1050 |
| N | 850 |
| O | 850 |
| P | 850 |
| Q | 850 |
| R | 850 |

The summation of the intensity values for each major diagonal of window 132 (i.e., diagonal $D_1$ is pixel B-2 to pixel R-18 and diagonal $D_2$ is pixel R-2 to pixel B-18) are provides in Table 3:

TABLE 3

| Diagonal | Total Intensity |
|---|---|
| $D_1$ | 1050 |
| $D_2$ | 1250 |

Once the total intensities for each row and column have been obtained, the method 110 identifies a maximum (i.e., $M_r$) and a minimum (i.e., $m_r$) total intensity of all the rows and a maximum (i.e., $M_c$) and a minimum (i.e., $m_c$) total intensity of all the columns and makes a comparison, as follows:

$$M_r - m_r \leq T_1 \qquad (1)$$

$$M_c - m_c \leq T_1 \qquad (2)$$

wherein $T_1$ is a predetermined threshold value. Furthermore, the method compares the total intensity values of the major diagonals, as follows:

$$|D_1 - D_2| \leq T_2 \qquad (3)$$

wherein $T_2$ is a predetermined threshold value. The threshold values $T_1$ and $T_2$ may be selected by the user or may be preprogrammed.

If each comparison is less than the associated threshold value (i.e., each of equations 1, 2 and 3 are true), the pixel is not a PTE. However, if at least one comparison exceeds the associated threshold value (i.e., at least one of equations (1), (2) and (3) is false), the pixel is considered a PTE.

For example, using $$T_1 = 1000 \text{(predetermined value)} \qquad (4)$$

$$T_2 = 500 \text{(predetermined value)} \qquad (5)$$

and applying the results of Tables 1, 2 and 3 to equations (1), (2) and (3), the following is obtained:

$$M_r = 3250 \text{(per row 13, see Table 1)} \qquad (6)$$

$$m_r = 850 \text{(per rows 2-12, see Table 1)} \qquad (7)$$

$$M_c = 2050 \text{(per column D, see Table 2)} \qquad (8)$$

$$m_c = 850 \text{(per columns } N\text{-}R, \text{see Table 2)} \quad (9)$$

$$D_1 = 1050 \text{(see Table 3)} \quad (10)$$

$$D_2 = 1250 \text{(see Table 3)} \quad (11)$$

Substituting the values for $M_r$ and $m_r$ for (6) and (7) into equation (1) provides:

$$3250 - 850 \leq 1000 \text{(false)} \quad (12)$$

Substituting the values for $M_c$ and $m_c$ for (8) and (9) into equation (2) provides:

$$2050 - 850 \leq 1000 \text{(false)} \quad (13)$$

Substituting the values for $D_1$ and $D_2$ for (10) and (11) into equation (3) provides:

$$|1050 - 1250| \leq 500 \text{(true)} \quad (14)$$

Thus, equation (1) (i.e., $2400 \leq 1000$) and equation (2) (i.e., $1200 \leq 1000$) would and equation (3) (i.e., $200 \leq 500$) would be true for the results of Tables 1, 2 and 3. Therefore, the pixel 130 (i.e., pixel J-10) may be classified as a PTE, and the method 110 may proceed as shown in boxes 122 and 124.

The second act (i.e., text detection), as shown in boxes 122 and 124 of FIG. 2, may determine whether the PTE includes text using a modified line detector kernel. If the PTE includes text, the selected pixel may be segmented to the text layer, as shown in box 126. In contrast, if the PTE is not identified as including text, the selected pixel may be segmented to the background layer, as shown in box 120.

Text detection of the method 110 may begin by identifying an M-by-M window 134 around the selected pixel 130, wherein the M-by-M window 134 is smaller than the N-by-N window 132. "M" may be selected by the user or may be pre-programmed. In one aspect, "M" may be a number between about 2 and about 300.

For example, as shown in FIG. 1, M may equal 7. Thus, the M-by-M window 134 (i.e., a 7 by 7 window) may include 7 rows (i.e., rows 7 to 13) and 7 columns (i.e., columns G to M) centered on pixel 130 (i.e., pixel J-10).

The method 110 may proceed to compare intensity values of each pixel in a first row and/or column to a corresponding pixel in an opposite row and/or column to determine whether each pixel in the first row and/or column has an intensity greater than the intensity of the corresponding pixel in the opposite row and/or column by a predetermined threshold value T3.

In one aspect, the method 110 may only compare the pixels directly bordering the M-by-M window 134. For example, referring to FIG. 1, the method 110 may only compare each pixel in row 7 (i.e., pixels G-7, H-7, I-7, J-7, K-7, L-7 and M-7) to each corresponding pixel in row 13 (i.e., pixels G-13, H-13, I-13, J-13, K-13, L-13 and M-13) and/or each pixel in column G (i.e., pixels G-7, G-8, G-9, G-10, G-11, G-12 and G-13) to each corresponding pixel in column M (i.e., pixels M-7, M-8, M-9, M-10, M-11, M-12 and M-13). In another aspect, the method 110 may compare additional pixels within the M-by-M window 134 to corresponding opposite pixels. For example, each pixel in row 8 (i.e., pixels G-8, H-8, I-8, J-8, K-8, L-8 and M-8) may be compared to a corresponding pixel in row 12 (i.e., G-12, H-12, I-12, J-12, K-12, L-12 and M-12).

The comparison may ask, for example, whether any of the following is true:

$$|I_{G\text{-}7} - I_{G\text{-}13}| \geq T_3 \quad (15)$$

$$|I_{H\text{-}7} - I_{H\text{-}13}| \geq T_3 \quad (16)$$

$$|I_{I\text{-}7} - I_{I\text{-}13}| \geq T3 \quad (17)$$

$$|I_{J\text{-}7} - I_{J\text{-}13}| \geq T3 \quad (18)$$

$$|I_{K\text{-}7} - I_{K\text{-}13}| \geq T3 \quad (19)$$

$$|I_{L\text{-}7} - I_{L\text{-}13}| \geq T3 \quad (20)$$

or $$|I_{M\text{-}7} - I_{M\text{-}13}| \geq T3 \quad (21)$$

wherein $I_{Y\text{-}X}$ is the intensity of the pixel located at column Y and row X. If any of equations 4-10 are true, then the selected pixel 130 may be designated as a true text pixel and segmented to the text layer, as shown in box 126 of FIG. 2. However, if none of the pixels in a row (or column) have an intensity greater than the intensities of the corresponding pixels in an opposite row (or column) by a predetermined threshold value $T_3$ (i.e., each of equations 15-21 are false), then the selected pixel 130 is not considered a text pixel and therefore is segmented to the background layer, as shown in box 120 of FIG. 2.

Applying equations 15-21 to the selected pixel 130 of FIG. 1 (i.e., pixel J-10) using the pixel intensities listed in FIG. 1 and a threshold value $T_3$ of 100, the following result for each of equations 15-21 is obtained:

$$|50 - 250| \geq 100 \quad (22)$$

or $$200 \geq 100 \text{(true)} \quad (23)$$

Therefore, pixel J-10 may be designated as a true text pixel and segmented to the text layer.

If we were to compare each pixel in column G to its corresponding pixel in column M we would obtain a different result. In particular, we would obtain $0 \geq 100$ for each comparison (i.e., $|50-50|$ for rows 7 through 12 and $|250-250|$ for row 13), which is false. However, so long as one comparison (either column or row) yields a result that is greater than the threshold $T_3$, the selected pixel 130 may be segmented as a text pixel.

Once each pixel in the array 100 is segmented into at least two layers (e.g., a text layer and background layer, as described above), the document may be separated into the at least two layers, and each layer may be compressed using a compression technique appropriate for that layer (e.g., LZW for the text layer and JPEG for the background layer).

Although the segmentation method is shown and described with respect to certain aspects, it is obvious that modifications will occur to those skilled in the art upon reading and understanding this specification. The segmentation method includes all such modifications and is limited only by the scope of the claims.

What is claimed is:

1. A method for compressing an array of pixels representing image data, wherein each pixel in said array has an associated intensity value, comprising:
   identifying an N-by-N window centered upon a selected pixel of said array of pixels;
   evaluating at least one pixel in said N-by-N window to determine whether said selected pixel is a potential text element, wherein said evaluating comprises:
   summing said intensity values of each pixel in a row for each row of pixels within said N-by-N window and identifying a row having a maximum total intensity and a row having a minimum total intensity, wherein a difference between said maximum total intensity of said row and said minimum total intensity of said row is compared to a first predetermined threshold value;

summing said intensity values of each pixel in a column for each column of pixels within said N-by-N window and identifying a column having a maximum total intensity and a column having a minimum total intensity, wherein a difference between said maximum total intensity of said column and said minimum total intensity of said column is compared to a second predetermined threshold value; and summing said intensity values of each pixel in a first major diagonal of said N-by-N window to obtain a first diagonal total intensity, summing said intensity values of each pixel in a second major diagonal of said N-by-N window to obtain a second diagonal total intensity and comparing a difference between said first diagonal total intensity and said second diagonal total intensity against a third predetermined threshold value;

after said identifying of said N-by-N window, if said evaluating determines that said selected pixel is a potential text element, then identifying an M-by-M window centered upon said selected pixel such that said M-by-M window is smaller than said N-by-N window;

determining whether said potential text element includes text by comparing at least two pixels within said M-by-M window;

assigning said selected pixel to a first layer of said plurality of layers if said determining determines that said potential text element includes text;

assigning said selected pixel to a second layer of said plurality of layers if said determining determines that said potential text element does not include text; and compressing said first layer using a first compression technique to create a first compressed layer.

2. The method of claim 1, further comprising compressing said second layer using a second compression technique.

3. The method of claim 2, wherein said first compression technique includes a lossless compression technique.

4. The method of claim 2, wherein said first compression technique includes LZW.

5. The method of claim 2, wherein said second compression technique includes a lossy compression technique.

6. The method of claim 2, wherein said second compression technique includes JPEG.

7. The method of claim 1, wherein N is a number between about 5 and about 500.

8. The method of claim 1, wherein M is a number between about 2 and about 300.

9. The method of claim 1, wherein said determining includes comparing at least two oppositely positioned pixels, wherein said oppositely positioned pixels border said M-by-M window.

10. A method for compressing an array of pixels representing image data into a plurality of layers, comprising:

identifying an N-by-N window centered on said selected pixel;

obtaining a total intensity value for each row, column and major diagonal of said N-by-N window;

comparing said total intensity values to determine whether said selected pixel is a potential text element;

after said identifying of said N-by-N window, if said selected pixel is determined to be a potential text element, then identifying an M-by-M window centered on said selected pixel such that said M-by-M window is smaller than said N-by-N window;

comparing at least two oppositely positioned pixels within said M-by-M window to determine whether said potential text element includes text; and assigning said selected pixel to a first layer of the plurality of layers if said potential text element includes text;

assigning said selected pixel to a second layer of said plurality of layers if said potential text element does not include text; and compressing said first layer using a first compression technique to create a first compressed layer.

11. The method of claim 10, further comprising compressing said second layer using a second compression technique.

12. The method of claim 11, wherein said first compression technique includes a lossless compression technique.

13. The method of claim 11, wherein said second compression technique includes a lossy compression technique.

* * * * *